US009703469B2

(12) United States Patent
Powell

(10) Patent No.: US 9,703,469 B2
(45) Date of Patent: Jul. 11, 2017

(54) DISTINGUISHING BETWEEN IMPULSES AND CONTINUOUS DRAG OPERATIONS ON A TOUCH-SENSITIVE SURFACE

(71) Applicant: DreamWorks Animation LLC, Glendale, CA (US)

(72) Inventor: Alexander P. Powell, Los Angeles, CA (US)

(73) Assignee: DreamWorks Animation LLC, Glendale, CA (US)

( * ) Notice: Subject to any disclaimer, the term of this patent is extended or adjusted under 35 U.S.C. 154(b) by 71 days.

(21) Appl. No.: 13/655,370

(22) Filed: Oct. 18, 2012

(65) Prior Publication Data

US 2014/0111441 A1    Apr. 24, 2014

(51) Int. Cl.
*G06F 3/0488*     (2013.01)
*G06F 3/0484*     (2013.01)

(52) U.S. Cl.
CPC ........ *G06F 3/0488* (2013.01); *G06F 3/04845* (2013.01)

(58) Field of Classification Search
CPC . G06F 3/04845; G06F 3/0488; G06F 3/04847
See application file for complete search history.

(56) References Cited

U.S. PATENT DOCUMENTS

| | | | |
|---|---|---|---|
| 5,861,874 A * | 1/1999 | Joto | 345/173 |
| 7,833,098 B2 * | 11/2010 | Ohta | 463/37 |
| 8,226,483 B2 * | 7/2012 | Endo | 463/37 |
| 8,277,321 B2 * | 10/2012 | Mori | 463/42 |
| 2007/0046647 A1 * | 3/2007 | Ohta | 345/173 |
| 2008/0150913 A1 * | 6/2008 | Bell et al. | 345/175 |
| 2008/0309630 A1 | 12/2008 | Westerman | |
| 2009/0096746 A1 | 4/2009 | Kruse et al. | |
| 2009/0128486 A1 * | 5/2009 | Nijlunsing | G06F 3/04847 345/157 |
| 2009/0174679 A1 | 7/2009 | Westerman | |
| 2010/0117962 A1 * | 5/2010 | Westerman et al. | 345/163 |
| 2010/0171712 A1 | 7/2010 | Cieplinski et al. | |
| 2010/0222143 A1 * | 9/2010 | Endo | 463/30 |
| 2010/0240428 A1 * | 9/2010 | Mori | 463/3 |
| 2010/0315372 A1 | 12/2010 | Ng | |
| 2011/0050607 A1 | 3/2011 | Park | |
| 2011/0074694 A1 | 3/2011 | Rapp et al. | |
| 2011/0185321 A1 | 7/2011 | Capela et al. | |

OTHER PUBLICATIONS

Keefe et al., "Drawing on Air: Input Techniques for Controlled 3D Line Illustration", IEEE Transactions on Visualization and Computer Graphics, vol. 13, No. 5, Sep./Oct. 2007, pp. 1067-1080.
Extended European Search Report and Search Opinion received for European Patent Application No. 13188816.6, mailed on Nov. 21, 2016, 10 pages.

* cited by examiner

*Primary Examiner* — Nicholas Lee
*Assistant Examiner* — Richard Hong
(74) *Attorney, Agent, or Firm* — Morrison & Foerster LLP

(57) ABSTRACT

A touch-sensitive surface for a computer animator to create or modify a computer-generated image includes processes for differentiating between click and drag operations. The included processes also beneficially reduce input errors. When a touch object (e.g., finger or stylus) touches the drawing table, information regarding the duration of the touch and the movement of the touch are used to determine whether the touch input represents a (graphical user interface) click or a drag operation.

27 Claims, 8 Drawing Sheets

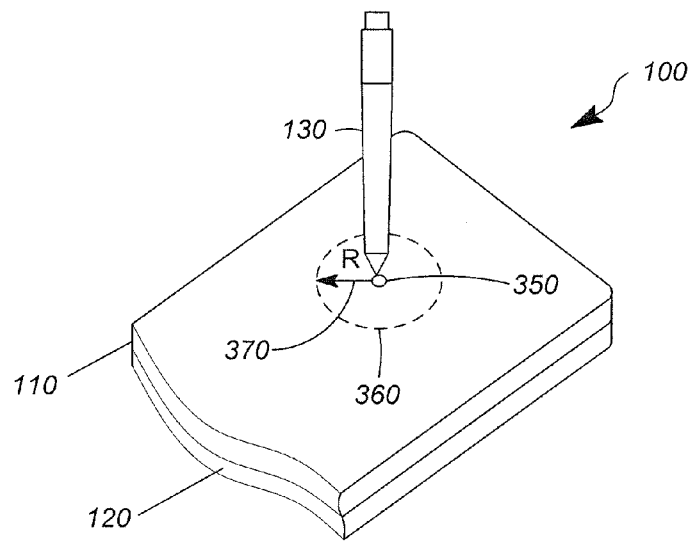
FIG. 3A
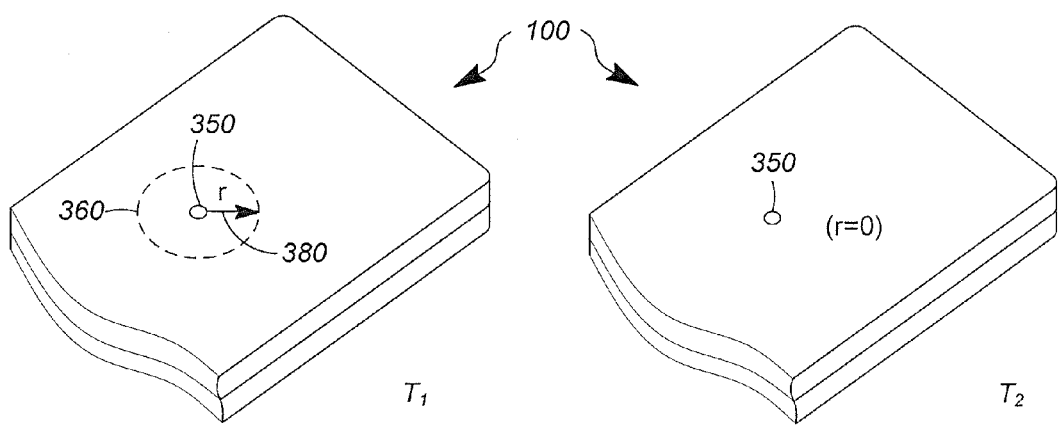
FIG. 3B
FIG. 3C

DISTINGUISHING BETWEEN IMPULSES AND CONTINUOUS DRAG OPERATIONS ON A TOUCH-SENSITIVE SURFACE

BACKGROUND

1. Field

This application relates generally to a touch-sensitive surface for creating or modifying a computer-generated image, and more specifically to a touch-sensitive surface adapted to reduce user-generated and/or device-generated input errors.

2. Related Art

In traditional animation, drawings are first drawn onto paper, and photographs of the drawings are taken and used as frames that form an animation film, in contrast, in computer animation, drawings are often drawn directly into a computing system. Computer input devices, such as touch-sensitive drawing surfaces and styluses, have taken on many of the functionalities that were traditionally provided by paper and pen.

FIG. 1 shows an exemplary drawing table 100 that can be used to create or modify a computer-generated image. Drawing table 100 includes touch-sensitive surface 110 that is arranged in close proximity with display 120. A user may interact with the displayed compute-generated image by moving a touch object, such as stylus 130, on touch-sensitive surface 110. Drawing table 100 tracks the positioning of stylus 130 across touch-sensitive surface 110.

Touch-sensitive surface 110 may be susceptible to user-generated and/or device-generated input errors. Jitters are one form of input errors. Jitters may be user-generated or device-generated. For example, if a user shakes his hand while he is drawing with stylus 130, drawing table 100 may perceive the shaking movement as input jitters that are then reflected in the computer-generated image being drawn. These jitters are considered to be user-generated. As another example, if an electronic component that is nearby touch-sensitive surface 110 generates electrical noise, touch-sensitive surface 110 may perceive the electrical noise as jitters that also become reflected in the computer-generated image being drawn. These jitters are considered to be device-generated. User imprecision is another form of input errors. For apparent biological reasons, rapid human hand movements tend to be imprecise, thus, a human user tends to trade precision for speed while using computer input devices (e.g., a stylus). User imprecision are also reflected in the computer-generated image being drawn.

These input errors are undesirable because they impact the ability of drawing table 100 to interpret user input accurately. Further, these input errors are especially acute for touch-sensitive surfaces that have relatively high precision, but relatively low accuracy, such as recent market offerings that support 600±DPI (dots-per-inch) input precision.

SUMMARY

In an exemplary embodiment, a drawing table for an animator to create or modify a computer-generated image comprises a touch-sensitive surface on which a computer-generated image is visible. The touch-sensitive surface is adapted to receive input from a touch object. When a touch object touches the touch-sensitive surface, a circle that is human-unperceivable is created at the location of the touch. The human-unperceivable circle is centered at location of the touch, and has a radius that begins at an initial value and decreases over time. The touch-sensitive surface produces output signals based on the perimeter of the human-unperceivable circle, which decreases over time according to the decreasing radius, and a movement of the touch object, over the same time span, as measured from the initial location.

In an exemplary embodiment, the touch-sensitive surface of a drawing table is arranged in close proximity with the display of a drawing table. In an exemplary embodiment, the touch-sensitive surface of a drawing table is integrated with the display of a drawing table. In an exemplary embodiment, the touch-sensitive surface is visually aligned with a projector that is projecting a computer-generated image.

In another exemplary embodiment, a touchscreen for an animator to create or modify a computer-generated image comprises a touch-sensitive surface that is integrated with a display screen on which a computer-generated image is visible. The touch-sensitive surface is adapted to receive input from a touch object. When a touch object touches the touch-sensitive surface, a circle that is human-unperceivable is created at the location of the touch. The human-unperceivable circle is centered at location of the touch, and has a radius that begins at an initial value and decreases over time. The touch-sensitive surface produces output signals based on the perimeter of the human-unperecivable circle, which decreases over time according to the decreasing radius, and a movement of the touch object, over the same time span, as measured from the initial location.

BRIEF DESCRIPTION OF THE FIGURES

FIG. 3A is a side view of an exemplary drawing table.

FIGS. 3B-3C are screenshots from the display of an exemplary drawing table.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Figure 1:
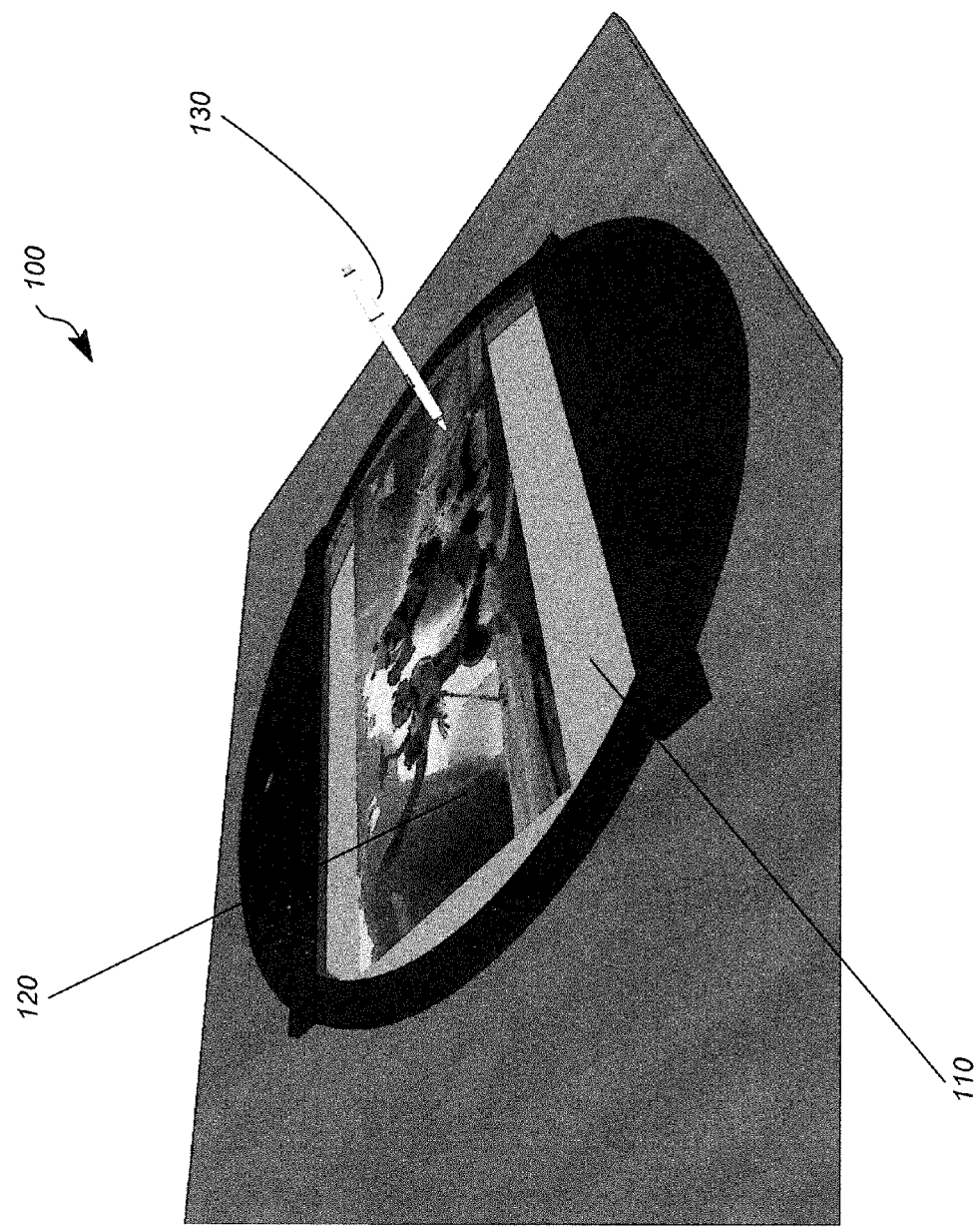
FIG. 1 is a front/side view of an exemplary drawing table for an animator to create or modify a computer-generated image.

As discussed above, FIG. 1 illustrates an exemplary drawing table 100 for an animator to create or modify a computer-generated image using a touch object such as stylus 130. As described in more detail below, drawing table 100 is adapted to reduce input errors by considering the amount of time that a touch object has been in contact with the drawing table and the amount of movement by the touch object during that time. In this way, drawing table 100 reduces user-generated and device generated input errors, thereby producing a drawing experience that more closely follows a user's intentions.

Figure 2:
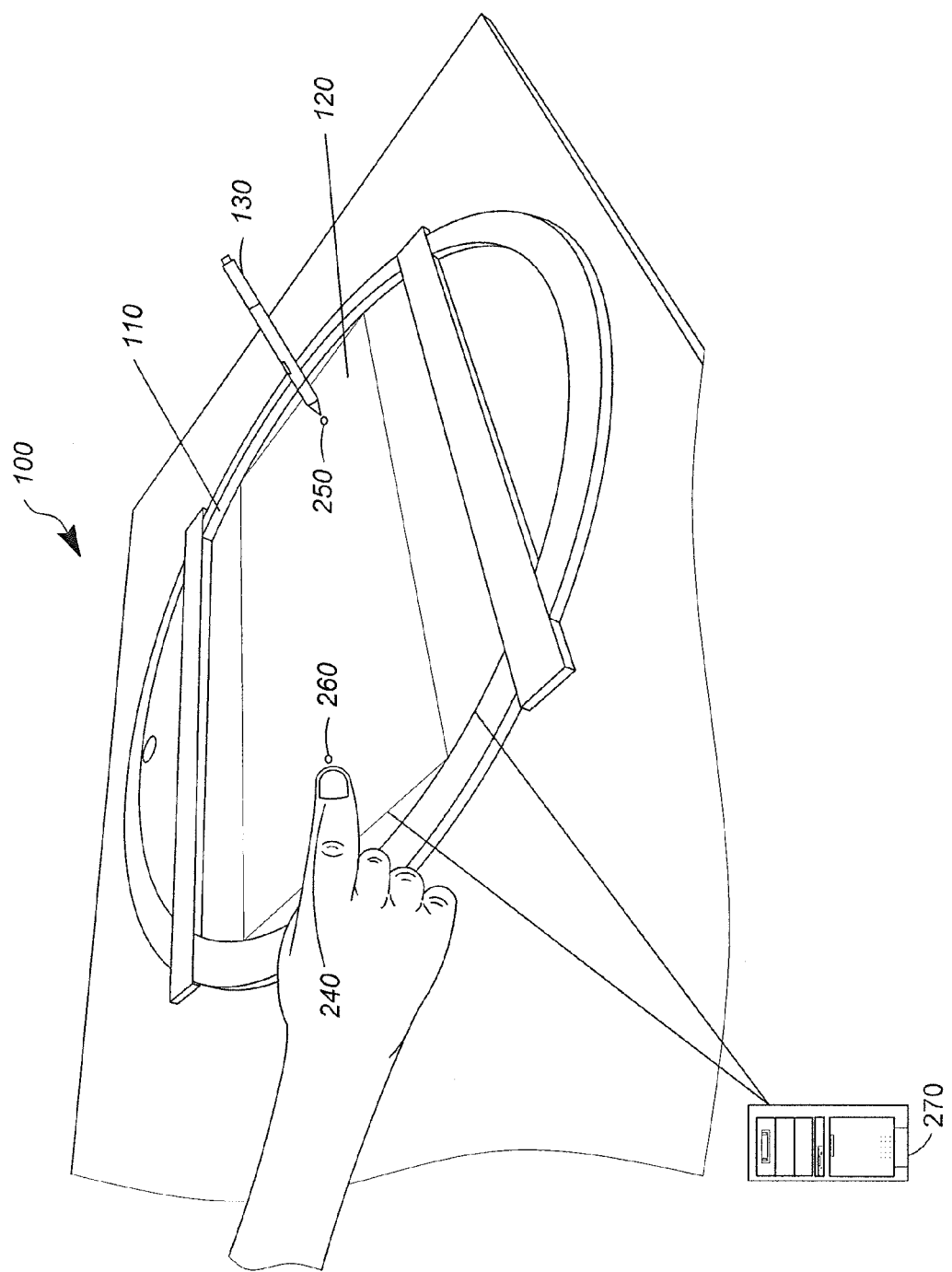
FIG. 2 is a side view of an exemplary drawing table.

Turning to FIG. 2, in the present exemplary embodiment, drawing table 100 includes touch-sensitive surface 110 disposed on top of display 120. Touch-sensitive surface 110 is transparent, or at least translucent, and is visually aligned with display 120. As such, images displayed on display 120 can be seen through touch-sensitive surface 110 by a user looking at display 120 through touch-sensitive surface 110. Further, as such, a location on touch-sensitive surface 110 corresponds to a proximate location on display 120. Touch sensitive surface 110 is sensitive to contact by touch objects such as, but not limited to, stylus 130, a user's finger tip 240, or the like. Touch-sensitive surface 110 and display 120 are connected to a processing unit such as processing unit 270.

Drawing table 100 may determine the location(s) of contact between touch-sensitive surface 110 and one or more touch objects, meaning that drawing table 100 may detect a single touch as well as multiple simultaneous touches. As shown in FIG. 2, location 250 corresponds to the location of contact between touch-sensitive surface 110 and stylus 130. Location 260 corresponds to the location of contact between touch-sensitive surface 110 and finger tip 240. The contacts at locations 250 and 260 may be simultaneous or may be separate temporally. Drawing table 100 may represent locations 250 and 260 using sets of coordinates, such as Cartesian (e.g., x and y) coordinates. The coordinates may correspond to the pixel layout of display 120 of drawing table 100.

As used here, the term "contact" includes direct a contact between a touch object and a touch-sensitive surface. The term "contact" also includes an indirect contact between a touch object and a touch-sensitive surface that are sufficiently close to be sensed by the touch-sensitive surface. For example, it is possible for a touch-sensitive surface to be covered with a protective material. In this situation, it is not possible for a touch object to be in direct contact with the protected touch-sensitive surface, but the indirect contact (i.e., separated by the protected material) may still be sufficient to cause the protected touch-sensitive surface to sense a touch. As another example, it is possible for some touch-sensitive surfaces, such as those employing capacitive touch screen technologies, to sense a touch object that is near but not in direct contact.

Moreover, the term "touch" is used to indicate a contact between a touch object with a touch-sensitive surface. The term "touch down" is used to indicate the initial moment of contact of a touch object on a touch sensitive surface. The term "touch release" is used to indicate that a touch object (that was in contact with touch-sensitive surface 110) has just been removed. Further, touch object movement, discussed in more detail below, refers to the path traversed by a touch object while the touch object is in contact with a touch-sensitive surface.

When a user provides input to drawing table 100 via one or more touches, drawing table 100 uses a combination of the above-described information, i.e., touch down events, touch release events, and/or touch object movements, to identify a Graphical User interface ("GUI") operation that corresponds to the user input. Examples of GUI operations that may be invoked by drawing table 100 in response to user input include click and drag GUI operations. Click and drag GUI operations are known in the art, and are not detailed here. One non-limiting example of a click GUI operation in the context of mouse input devices is the brief press and release of a mouse button. One non-limiting example of a drag GUI operation in the context of mouse input devices is the movement of a mouse while a mouse button is pressed.

In theory, the occurrence of a touch down event and a touch release event without touch object movement represents a click GUI operation. A click GUI operation constitutes an "impulse" type of GUI operation. Also in theory, the occurrence of a touch down event and a touch release event with touch object movement represents a drag GUI operation. Thus, in theory, the determination of whether a given user input represents a click or drag GUI operation can be differentiated based on a measurement of touch object movement.

In practice, however, user-generated and device-generated input errors can impact the ability of a touch-sensitive surface to accurately measure touch object movement. Specifically, due to input errors, touch-sensitive surface 110 may sense a non-zero touch object movement even when the user intended no movement (e.g., the user may have intended only a quick tap). If drawing table 100 interprets the user input (in combination with the input jitters) as described above, the perceived touch object movement (due to input jitters) may cause drawing table 100 to erroneously perform a drag GUI operation instead of a click GUI operation, even if the user attempted to only tap on the drawing table for a click GUI operation. One of ordinary skill in the art would appreciate that an inadvertent drag GUI operation may cause GUI elements to move unexpectedly, thereby inconveniencing the user. Indeed, frequent erroneous drag GUI operations can render drawing table 100 impractical for use in a GUI environment.

To improve accuracy in distinguishing between click and drag GUI operations, drawing table 100 uses information about the amount of time that a touch object has been in contact with touch-sensitive surface 110 in addition to the other information described above (i.e., touch down events, touch release events, and/or touch object movements). This use of information regarding the duration of a contact is discussed in detail, below.

1. Circle of Decreasing Radius

Upon the touch down of a touch object on touch-sensitive surface 110, drawing table 100 creates a human-unperceivable circle that is centered at the location of the touch. Drawing table 100 maintains the human-unperceivable circle for the duration of the touch, meaning that the human-unperceivable circle is removed at the touch release of the touch object. The human-unperceivable circle has a radius that begins at an initial value but decreases over time. For example, upon the touch down of a touch object, a human-unperceivable circle having a radius of 100 pixels may be created, but the radius may decrease to zero pixels after a short duration. As the radius of the human-unperceivable circle decreases, the perimeter of the human-unperceivable circle also decreases proportionately. In one embodiment, the radius of the human-unperceivable circle decreases with an exponential factor of 5 over 0.5 seconds.

The human-unperceivable circle is referred to as being human-unperceivable because a human user cannot perceive the circle unaided. Although a human-unperceivable circle is not displayed by display 120 in a human-perceivable fashion during normal usage of drawing table 100, in some instances, the otherwise human-unperceivable circle can be displayed visibly by display 120. One instance where it may be helpful to visibly display an otherwise human-unperceivable circle is during a debug session. Further, a human-unperceivable circle that has been reduced to zero radius (e.g., due to a lengthy touch duration) is distinguished from the non-existence of a circle (i.e., due to an absence of any touch objects in contact with touch-sensitive surface 110).

FIG. 3A illustrates exemplary human-unperceivable circle 360 that is created by drawing table 100 in response to initial contact between stylus 130 and touch-sensitive surface 110 at location 350. Human-unperceivable circle 360, shown in FIG. 3A using dotted lines, is centered at location 350, and has an initial radius 370 of value R. The radius (and the corresponding perimeter) of human-unperceivable circle 360 decreases over time.

FIG. 3B illustrates human-unperceivable circle 360 after stylus 130 (not shown) has remained in contact with touch-sensitive surface 110 at location 350 for an amount of time $T_1$. At time human-unperceivable circle 360 has radius 380 of value r, which is less than R. In FIG. 3C, stylus 130 has remained in contact with touch-sensitive surface 110 at location 350 for an additional amount of time. As FIG. 3C demonstrates, by time $T_2$ (after human-unperceivable circle 360 is decreased to have a radius of zero (and is therefore not visibly drawn in FIG. 3C). In this way, drawing table 100 maintains a human-unperceivable circle that corresponds to a contact between a touch object (e.g., stylus 130) and touch-sensitive surface 110.

2. Movements of a Touch Object

Drawing table 100 also maintains information about the movement of a touch object while the touch object is in contact with touch-sensitive surface 110. Drawing table 100 may use the movement information to determine whether a touch object has moved beyond the area inside the perimeter of the corresponding human-unperceivable circle.

3. Click GUI Operation

Drawing table 100 uses the above-described touch down events, touch release events, human-unperceivable circle of decreasing radius, and/or touch object movements to distinguish whether certain user input on touch-sensitive surface 110 represents a click GUI operation or a drag GUI operation. When a touch object comes in contact with drawing table 100 (i.e., a touch down event) and is then removed from contact with drawing table 100 (i.e., a touch release event), and the movement of the touch object from touch down to touch release is entirely within the perimeter of the corresponding human-unperecivable circle, drawing table 100 invokes a click GUI operation that is based on the initial location of the touch (e.g., the location of the initial contact).

Drag GUI Operation

When a touch object comes into contact with drawing table 100 and the touch object is moved while remaining in contact with drawing table 100, and the touch object movement (e.g., any portion of the touch object movement) exceeds the perimeter of the corresponding human-unperceivable circle, drawing table 100 invokes a drag GUI operation. A drag GUI operation moves along a path. This path is based on a combination of the initial location of the touch and/or the movement of the touch object. For example, the drag GUI operation may begin at the location of the initial contact and proceed according to the movement path of the touch object.

Once the drag GUI operation is invoked, any additional movements of the touch object are considered to be part of the drag GUI operation until the touch object is removed from drawing table 100, meaning that the path of the drag GUI operation continues to correspond to the movement of the touch object until the touch object is removed from contact with drawing table 100. The drag GUI operation continues even if the stylus is moved back inside the perimeter of the human-unperceivable circle.

Figure 4B:
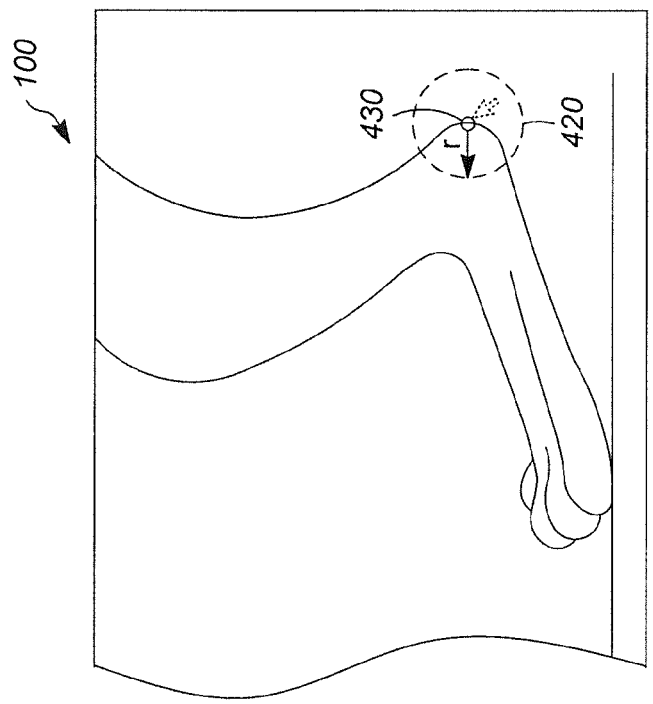
FIG. 4B is a screenshot from the display of an exemplary drawing table.
Figure 4A:
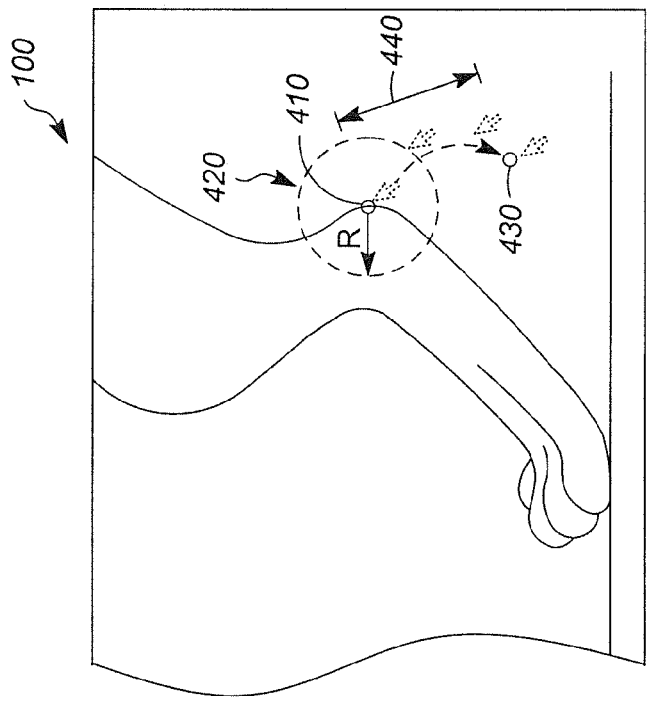
FIG. 4A is a screenshot from the display of an exemplary drawing table.

FIGS. 4A-B illustrate an exemplary drag GUI operation in the context of a drawing table working together with a computer animation software. As shown in FIG. 4A, the display of drawing table 100 displays the leg of a computer animated character that is generated using a computer animation software. The computer animation software allows the heel of the computer animated character to be moved upwardly and downwardly via a drag GUI operation. For sake of simplicity, FIGS. 4A-4B do not show a touch object.

FIG. 4A represents contact between a touch object and drawing table 100 at location 410 at an initial time. In response to the touch, human-unperceivable circle 420 having centered at location 410 is created. As discussed above, human-unperceivable circle 420 may have a radius (and a corresponding perimeter) that decreases over time. Although human-unperceivable circle 420 is shown in FIG. 4A using dotted lines, human-unperceivable circle 420 need not necessarily be displayed visibly on the display of drawing table 100.

FIG. 4A also represents movement of the touch object that is in contact with drawing table 100 at a subsequent time. In FIG. 4A, the touch object is moved from location 410 to location 430. Because the movement of the touch object extends beyond the perimeter human-unperceivable circle 420 (as determined by the radius of the human-unperceivable circle as of the touch object movement), drawing table 100 invokes a drag GUI operation. FIG. 4B shows an exemplary response to the drag GUI operation, by the computer animation software, in which the heel position of the computer animated character is lowered.

It should be noted that FIGS. 4A-4B provide an exemplary response to a drag GUI operation. Drawing table 100 is not limited to use with computer animation software. For example, a presentation software may receive input from drawing table 100, and may thus utilize the above-described processes to determine whether a user is attempting to edit (i.e., click) or to move (i.e., drag) a text box. As another example, a web browser software may also receive input from drawing table 100, and may thus utilize the above-described processes to determine whether a user is attempting to select (i.e., click) or to scroll (i.e., drag) a portion of a web page.

5. No GUI Operation

Drawing table 100 ignores certain touch object inputs, meaning that drawing table 100 may sometimes perform no (GUI) operation in response to touches and/o movement by a touch object. For example, when drawing table 100 detects small amounts of movement by a touch object, the small movements may be caused by input errors, and drawing table 100 may beneficially invoke no operation in response to the small movements.

Specifically, when a touch object comes into contact with drawing table 100, and the touch object is moved while remaining in contact with drawing table 100 entirely within the perimeter of the corresponding human-unperceivable circle, drawing table 100 filters the movement of the touch object and does not invoke no operation. Drawing table 100 may filter the touch object movement by producing an output signal that represents no operation. The concept of no operation, or no-operation, is known in the art and is not explained here. One of ordinary skill in the art would appreciate an output signal representing "no-operation" may be, for example, a specific output signal that represents a nullity (e.g., a Boolean value of zero), or a null output signal (e.g., a floating output).

Figure 5:
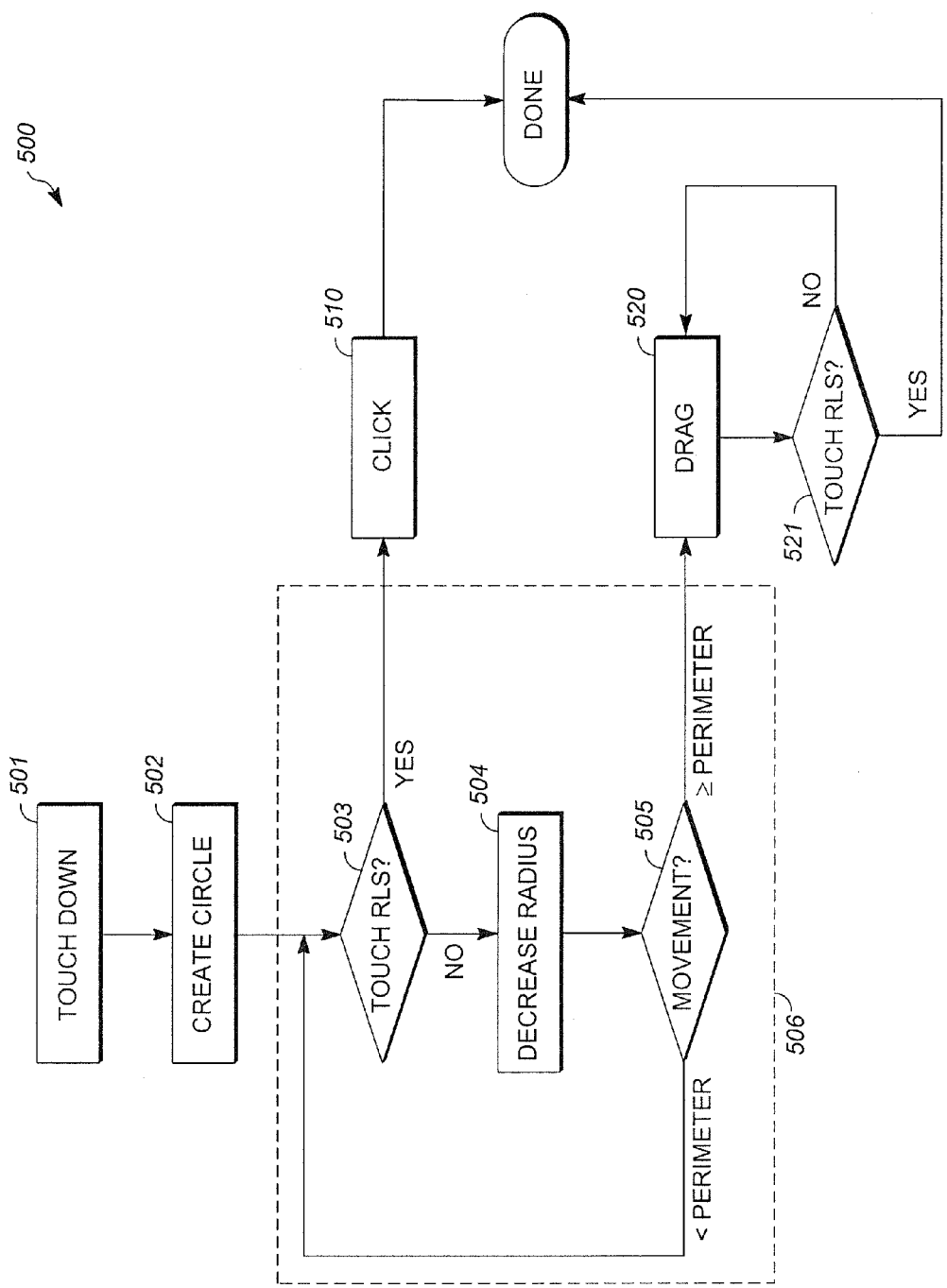
FIG. 5 is a flowchart illustrating an exemplary process for distinguishing between impulses and drag operations on a drawing table.
Figure 6:
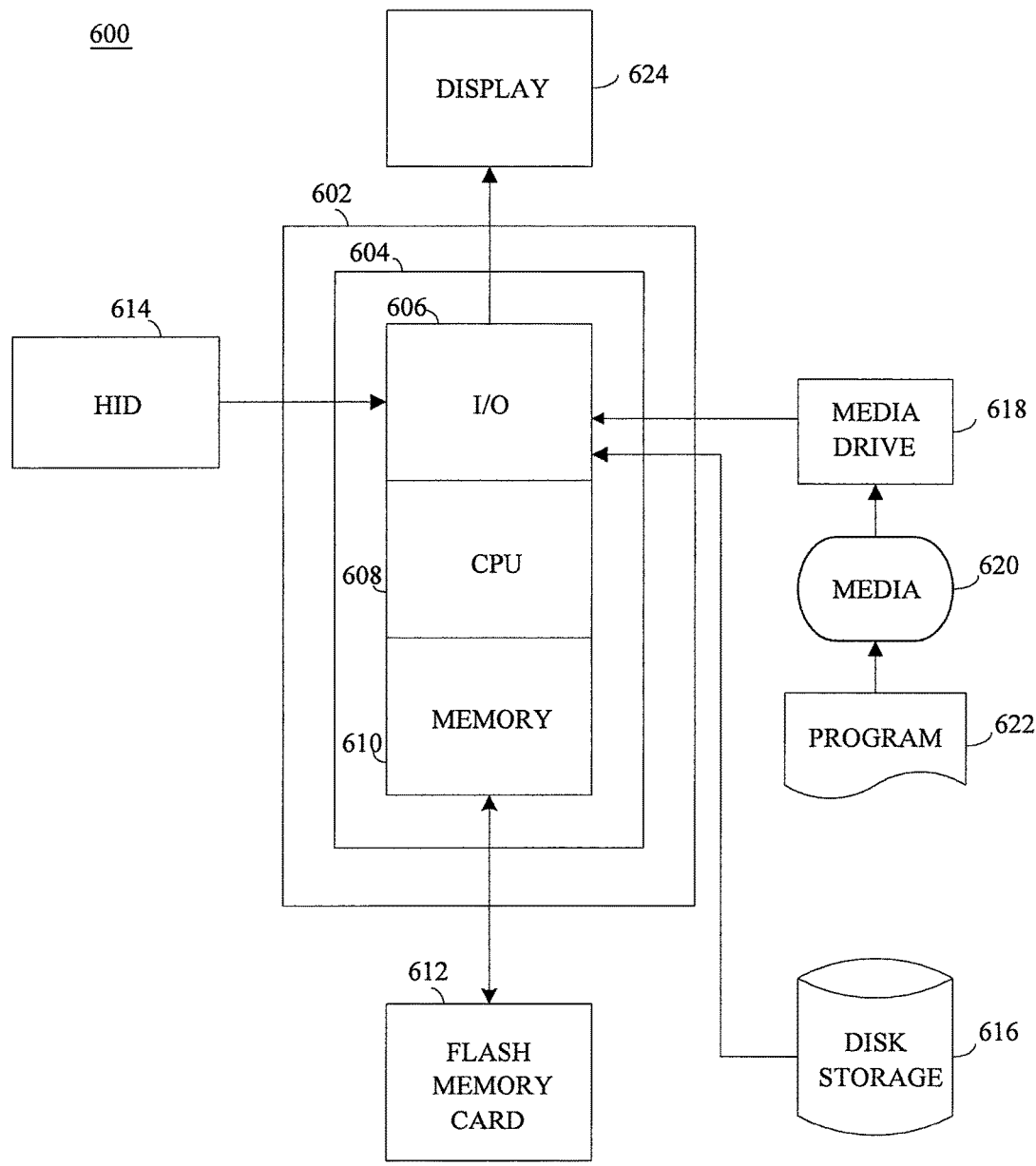
FIG. 6 is a block diagram illustrating an exemplary computing system.

FIG. 5 illustrates exemplary process 500 that may be implemented by drawing table 100 to carry out the above-described processes. At block 501, contact is determined between a touch object and a touch-sensitive surface, such as touch-sensitive surface 110 of drawing table 100. At block 502, drawing table 100 creates a human-unperceivable circle. The human-unperceivable circle is centered at the initial location of the contact between the touch object and the touch-sensitive surface 110, and has an initial radius that decreases over time. At block 503, drawing table 100 determines whether the touch object is still in contact with touch-sensitive surface 110.

If the touch object is no longer in contact with touch-sensitive surface 110 (i.e., the touch object has been released), then processing proceeds to block 510, where a click GUI operation is produced. Process 500 ends after block 510. If the touch object is still in contact with touch-sensitive surface 110, processing proceeds from block 503 to block 504. At block 504, the radius (and corresponding perimeter) of the human-unperceivable circle is reduced according to the above-described processes. At block 505, drawing table 100 determines whether the touch object has moved outside the perimeter of the human-unperceivable circle (as of the current radius), if the movement of the touch object is entirely within the perimeter of the human-unperceivable circle (as of the current radius), then processing returns to block 503. If any part of the movement by the touch object extends beyond the perimeter of the human-unperceivable circle (as of the current radius), then process 500 proceeds to step 520.

At step 520, drawing table 100 produces a drag GUI operation. The path of the drag GUI operation corresponds to the movement of the touch object. For example, a mouse cursor may be displayed on the display of a drawing table, and the location of the mouse cursor may match the (changing) location of the contact between the touch object and the touch-sensitive surface of the drawing table. At step 521, drawing table 100 determines whether the touch object is still in contact with touch-sensitive surface 110.

If the touch object is no longer in contact with touch-sensitive surface 110 (i.e., the touch object has been released), then processing process 500 ends. If the touch object is still in contact with touch-sensitive surface 110, processing returns to block 520, where additional movement of the touch object are treated as additional movements in the drag GUI operation.

It should be appreciated that it is possible for process 500 to cycle between blocks 503-505. When process 500 cycles between blocks 503-505 (which is represented by region 506 of FIG. 5), drawing table 100 does not invoke a click nor a drag GUI operation. Instead, during the processes within region 506, drawing table may invoke no operation.

Process 500 (FIG. 5) or a similar process may be implemented using a computing system, such as processing unit 270 (FIG. 2). FIG. 7 illustrates an exemplary computing system 600 that may be processing unit 270 (FIG. 2) in some embodiments. Computing system 600 receives input from human input device ("HID") 614. HID 614 may be a touch-sensitive surface such as touch-sensitive surface 110 (FIG. 1) of a drawing table, for example. Computing system 600 provides output to display 624, which may be display 120 (FIG. 1) of a drawing table, for example.

Computing system 600 includes main system 602, which includes motherboard 604 having input/output ("I/O") section 606, one or more central processing units ("CPU") 608, and memory section 610, which may have memory module 612 related to it. Memory module 612 may be a flash memory device, a removable memory "stick", or the like. The I/O section 606 is connected to HID 614 and display 624. I/O section 606 may also be connected to disk storage unit 616, and/or media drive unit 618.

Media drive unit 618 can read/write to/from a computer-readable medium 620, which can store (e.g., tangibly embody) computer-executable instructions 622 and/or data for carrying out some or all aspects of the above-described processes. Computer-executable instructions 622 may be part of the operating system or operating platform of computing system 600. Computer-executable instructions 622 may be a driver or an application program (e.g., a computer animation software) of computing system 600. Computer-executable instructions 622 may be programmed, for example, in a general-purpose programming language (e.g., Pascal, C, C++, JAVA) or some specialized application-specific language.

Computing system 600 may also include circuitry or other specialized hardware for carrying out some or all aspects of the above-described processes. For example, one of the CPUs 608 may have application-specific circuitry (e.g., application-specific integrated circuits) for carrying out some or all aspects of the above-described processes. In some operational settings, computing system 600 may be adapted as a system that includes one or more units, each of which is adapted to carry out some aspects of the processes either in software, hardware, or some combination thereof. At least some values based on the results of the above-described processes can be saved for subsequent use.

In the present exemplary embodiment, touch-sensitive surface 110 and display 120 of drawing table 100 may be separate units that are in arranged close proximity, or may be integrated as one touch-sensitive display (e.g., "touch-screen") unit. Touch-sensitive surface 110 may be a resistive touch screen, a capacitive touch screen, or the like. Display 120 may be a LCD screen, LED screen, or the like.

Figure 7A:
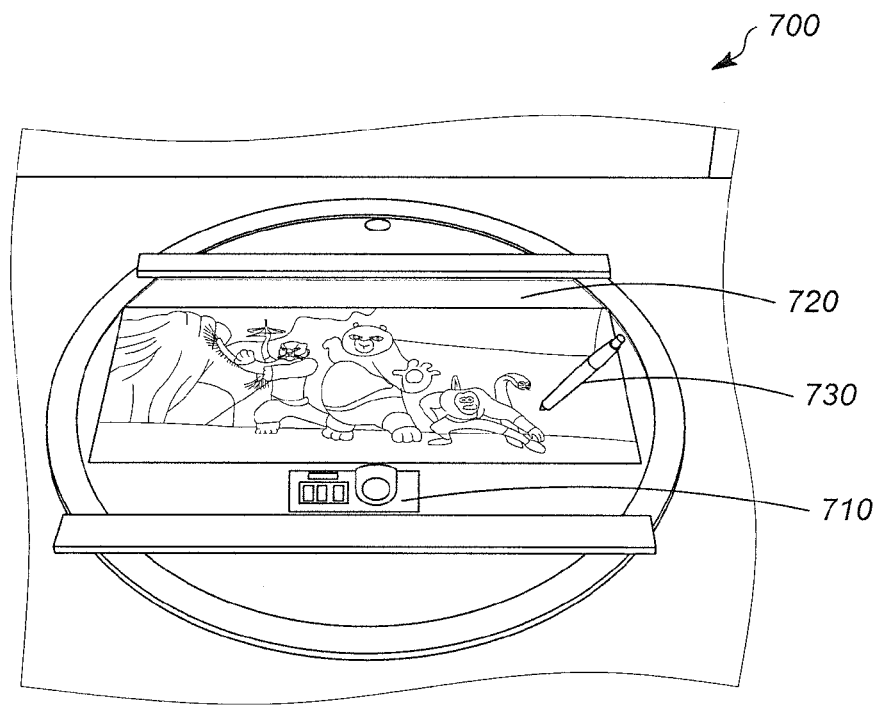
FIG. 7A is a top view of an embodiment of a drawing table.
Figure 7B:
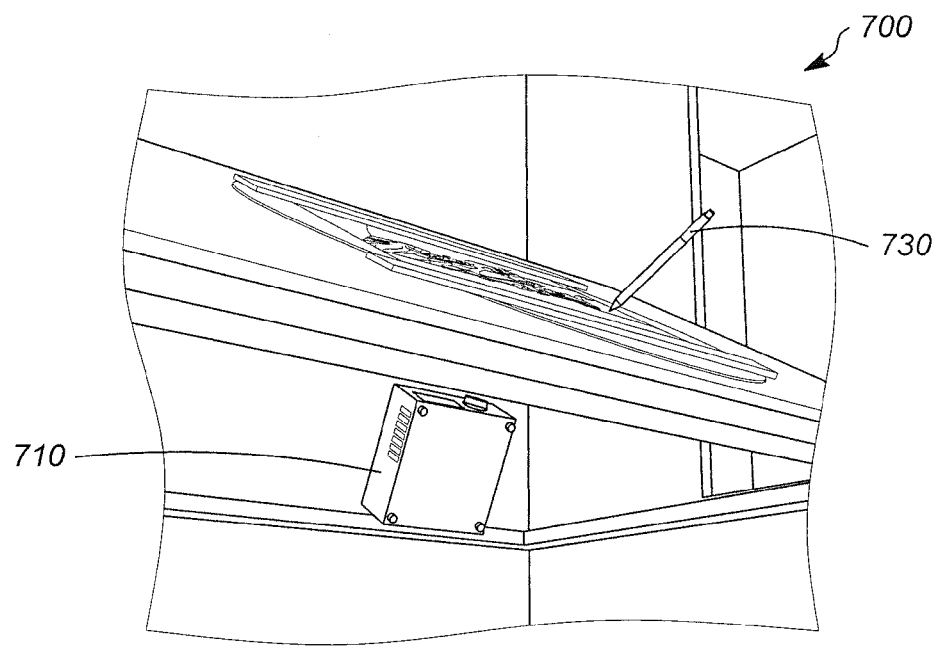
FIG. 7B is a side view of an embodiment of a drawing table.

In one embodiment, drawing table 100 comprises: a touch-sensitive surface that is physically separate from a display projector. FIGS. 7A and 7B illustrate an embodiment of a drawing table (700) in which projector 710 is mounted below a touch-sensitive surface 720. Projector 710 projects computer-generated images onto touch-sensitive surface 720 and/or a display surface that is adjacent to touch-sensitive surface 720. A user may use a touch object such as stylus 730 to interact with drawing table 700 via touch-sensitive surface 720.

Figure 8:
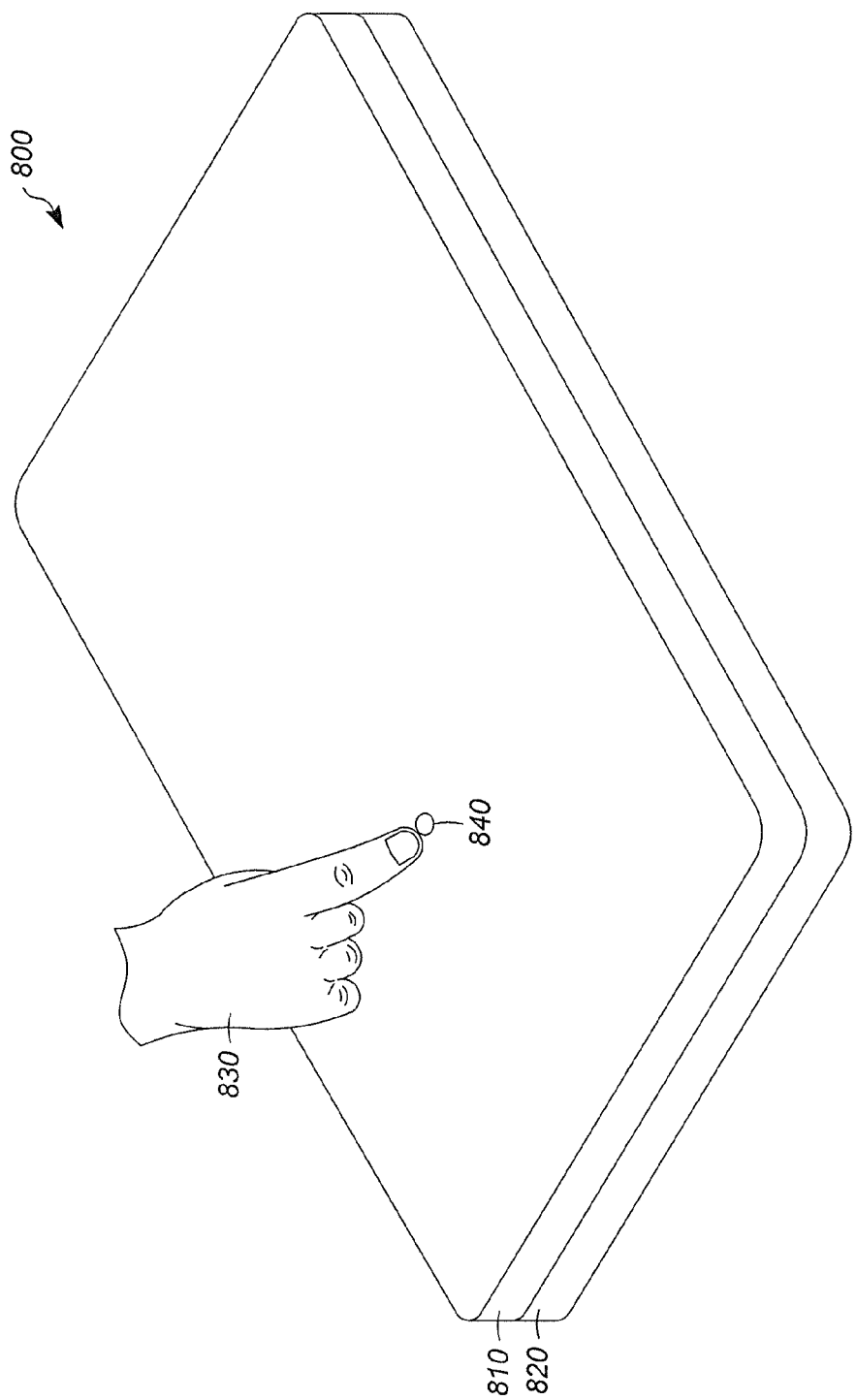
FIG. 8 is a front/side view of an exemplary touchscreen.

The above-described processes are not limited to drawing tables. In one embodiment, a touch sensitive surface and a display for carrying out the above-described processes are integrated into a mobile device. The mobile device may be a cellular phone, a tablet computer, or the like. FIG. 8 illustrates exemplary tablet computer 800 comprising touch-sensitive surface 810 and display 820. In one embodiment, a touch-sensitive surface and a display for carrying out the above-described processes are physically separate. For example, the display may be a computer monitor and the touch-sensitive surface may be a touch "pad", WACOM CO. LTD, is an exemplary manufacturer of touch pads that can be used in this manner.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A drawing table for a computer animator to create or to modify a computer-generated image, comprising:
a touch-sensitive surface adapted to receive touch input from a touch object, wherein the computer-generated image is visible to the computer animator when the computer animator views the touch-sensitive surface; and
a processor connected to the touch-sensitive surface, wherein the processor is adapted to:
detect a touch between the touch object and the touch-sensitive surface at an initial location on the touch-sensitive surface;
create a human-unperceivable circle in response to the touch between the touch object and the touch-sensitive surface,
wherein the human-unperceivable circle is centered at the initial location of the touch,
wherein the human-unperceivable circle has a radius of an initial value at the time that the human-unperceivable circle is created, and
wherein, while the touch continues to be detected, the radius decreases from the initial value over time to a value less than the initial value;
determine whether any portion of a movement of the touch object on the touch-sensitive surface is outside the perimeter of the human-unperceivable circle at the time of the movement;
if any portion of the movement is outside the perimeter, then output a signal representing a graphical user interface operation; and
if no portion of the movement is outside the perimeter, then forgoing output of the signal representing the graphical user interface operation.

2. The drawing table of claim 1, wherein the processor is further adapted to:
before outputting the signal representing the graphical user interface operation, determine whether the touch object is removed from the touch-sensitive surface;
if the touch object is removed, then output a mouse click operation as the signal representing the graphical user interface operation; and
if the touch object is not removed, then output a drag operation as the signal representing the graphical user interface operation.

3. The drawing table of claim 1, wherein:
the radius of the human-unperceivable circle decreases at an exponential rate.

4. The drawing table of claim 3, wherein:
the radius of the human-unperceivable circle decreases by an exponential factor of five over a half second.

5. The drawing table of claim 1, further comprising:
a display coupled with the touch-sensitive surface and connected to the processor, wherein the display is adapted to display the computer-generated image through the touch-sensitive surface.

6. The drawing table of claim 1, further comprising:
a projector connected to the processor, wherein the projector is adapted to project the computer-generated image onto the touch-sensitive surface.

7. The drawing table of claim 1, wherein the touch object is a stylus.

8. A touchscreen device for displaying a computer-generated image and receiving input from a touch object, comprising:
(a) a touch-sensitive surface adapted to detect contact with the touch object;
(b) a display screen adapted to display the computer-generated image, wherein:
the display screen is visually aligned with the touch-sensitive surface such that the computer-generated image displayed on the display screen is visible to a user when the user views the touch-sensitive surface; and
(c) a processor connected to the touch-sensitive surface and the display screen, wherein the processor is adapted to:
detect a touch between the touch object and the touch-sensitive surface at an initial location on the touch-sensitive surface;
create a human-unperceivable circle in response to the touch between the touch object and the touch-sensitive surface,
wherein the human-unperceivable circle is centered at the initial location of the touch,
wherein the human-unperceivable circle has a radius of an initial value at the time that the human-unperceivable circle is created, and
wherein, while the touch continues to be detected, the radius decreases from the initial value over time to a value less than the initial value;
produce an output signal representing a graphical user interface drag operation, if the touch object is touching the touch-sensitive surface, and if any portion of a touch object movement on the touch-sensitive surface is outside the perimeter of the human-unperceivable circle at the time of the touch object movement;
produce an output signal representing no operation, if the touch object is touching the touch-sensitive surface, and if no portion of the touch object movement is outside the perimeter of the human-unperceivable circle at the time of the touch object movement; and
produce an output signal representing a mouse click operation, if the touch object is removed from the touch-sensitive surface, and if no portion of the touch object movement is outside the perimeter of the human-unperceivable circle at the time of removal.

9. The touchscreen device of claim 8, wherein:
the radius of the human-unperceivable circle decreases at an exponential rate.

10. The touchscreen device of claim 9, wherein:
the radius of the human-unperceivable circle decreases by an exponential factor of five over a half second.

11. The touchscreen device of claim 8, wherein the touch object is a stylus.

12. A computer-implemented method for distinguishing touch input representing a graphical user interface drag operation and a graphical user interface click operation, the method comprising:
detecting touch input from a touch object at an initial location on a touch-sensitive surface;
determining a human-unperceivable circle in response to the touch input,
wherein the human-unperceivable circle is centered at the initial location of the initial touch input,
wherein the human-unperceivable circle has a radius of an initial value at the time that the human-unperceivable circle is determined, and
wherein, while the touch input continues to be detected, the radius decreases from the initial value over time to a value less than the initial value;

distinguishing whether the touch input represents a graphical user interface drag operation or a graphical user interface click operation, based on a movement of the touch object on the touch-sensitive surface and a perimeter of the human-unperceivable circle; and producing an output signal, wherein the output signal represents the distinguished graphical user interface operation.

13. The computer-implemented method of claim 12, wherein:

while the touch object is touching the touch-sensitive surface, if any portion of the touch object movement is outside the perimeter of the human-unperceivable circle at the time of touch object movement, then the distinguished graphical user interface operation represents a graphical user interface drag operation.

14. The computer-implemented method of claim 12, wherein:

when the touch object is removed from the touch-sensitive surface, if no portion of the touch object movement is outside the perimeter of the human-unperceivable circle at the time of removal, then the distinguished graphical user interface operation represents a mouse click operation.

15. The computer-implemented method of claim 12, further comprising:

distinguishing whether the touch input represents no operation from the graphical user interface click operation and the graphical user interface drag operation, wherein:

while the touch object is touching the touch-sensitive surface, if no portion of the touch object movement is outside the perimeter of the human-unperceivable circle at the time of the movement, then the distinguished graphical user interface operation represents no operation.

16. The computer-implemented method of claim 12, wherein:

the radius of the human-unperceivable circle decreases at an exponential rate.

17. The computer-implemented method of claim 16, wherein:

the radius of the human-unperceivable circle decreases by an exponential factor of five over a half second.

18. The computer-implemented method of claim 12, further comprising:

displaying a computer-generated image on a display screen, wherein the display screen is visually aligned with the touch-sensitive surface, and wherein the computer-generated image is visible to a user through the touch-sensitive surface.

19. The computer-implemented method of claim 12, wherein the touch object is a stylus.

20. A non-transitory computer-readable storage medium having computer-executable instructions for distinguishing between touch input representing a graphical user interface drag operation and a graphical user interface click operation, the computer-executable instructions comprising instructions for:

detecting touch input from a touch object at an initial location on a touch-sensitive surface;

determining a human-unperceivable circle in response to the touch input, wherein the human-unperceivable circle is centered at the initial location of the touch input, wherein the human-unperceivable circle has a radius of an initial value at the time that the human-unperceivable circle is determined, and wherein, while the touch input continues to be detected, the radius decreases from the initial value over time to a value less than the initial value; and distinguishing whether the touch input represents a graphical user interface drag operation or a graphical user interface click operation, based on a movement of the touch object on the touch-sensitive surface and a perimeter of the human-unperceivable circle; and producing an output signal, wherein the output signal represents the distinguished graphical user interface operation.

21. The non-transitory computer-readable storage medium of claim 20, wherein:

while the touch object is touching the touch-sensitive surface, if any portion of the touch object movement is outside the perimeter of the human-unperceivable circle at the time of touch object movement, then the distinguished graphical user interface operation represents a graphical user interface drag operation.

22. The non-transitory computer-readable storage medium of claim 20, wherein:

when the touch object is removed from the touch-sensitive surface, if no portion of the touch object movement is outside the perimeter of the human-unperceivable circle at the time of removal, then the distinguished graphical user interface operation represents a mouse click operation.

23. The non-transitory computer-readable storage medium of claim 20, further comprising instructions for:

distinguishing whether the touch input represents no operation from the graphical user interface click operation and the graphical user interface drag operation, wherein:

while the touch object is touching the touch-sensitive surface, if no portion of the touch object movement is outside the perimeter of the human-unperceivable circle at the time of the movement, then the distinguished graphical user interface operation represents no operation.

24. The non-transitory computer-readable storage medium of claim 20, wherein:

the radius of the human-unperceivable circle decreases at an exponential rate.

25. The non-transitory computer-readable storage medium of claim 24, wherein:

the radius of the human-unperceivable circle decreases by an exponential factor of five over a half second.

26. The non-transitory computer-readable storage medium of claim 20, further comprising instructions for:

displaying a computer-generated image on a display screen, wherein the display screen is visually aligned with the touch-sensitive surface, and wherein the computer-generated image is visible to a user through the touch-sensitive surface.

27. The non-transitory computer-readable storage medium of claim 20, wherein the touch object is a stylus.

* * * * *